Dec. 20, 1966     P. A. COSTABILE     3,292,412
PROGRESSIVE DIE
Filed Dec. 13, 1963     5 Sheets-Sheet 1
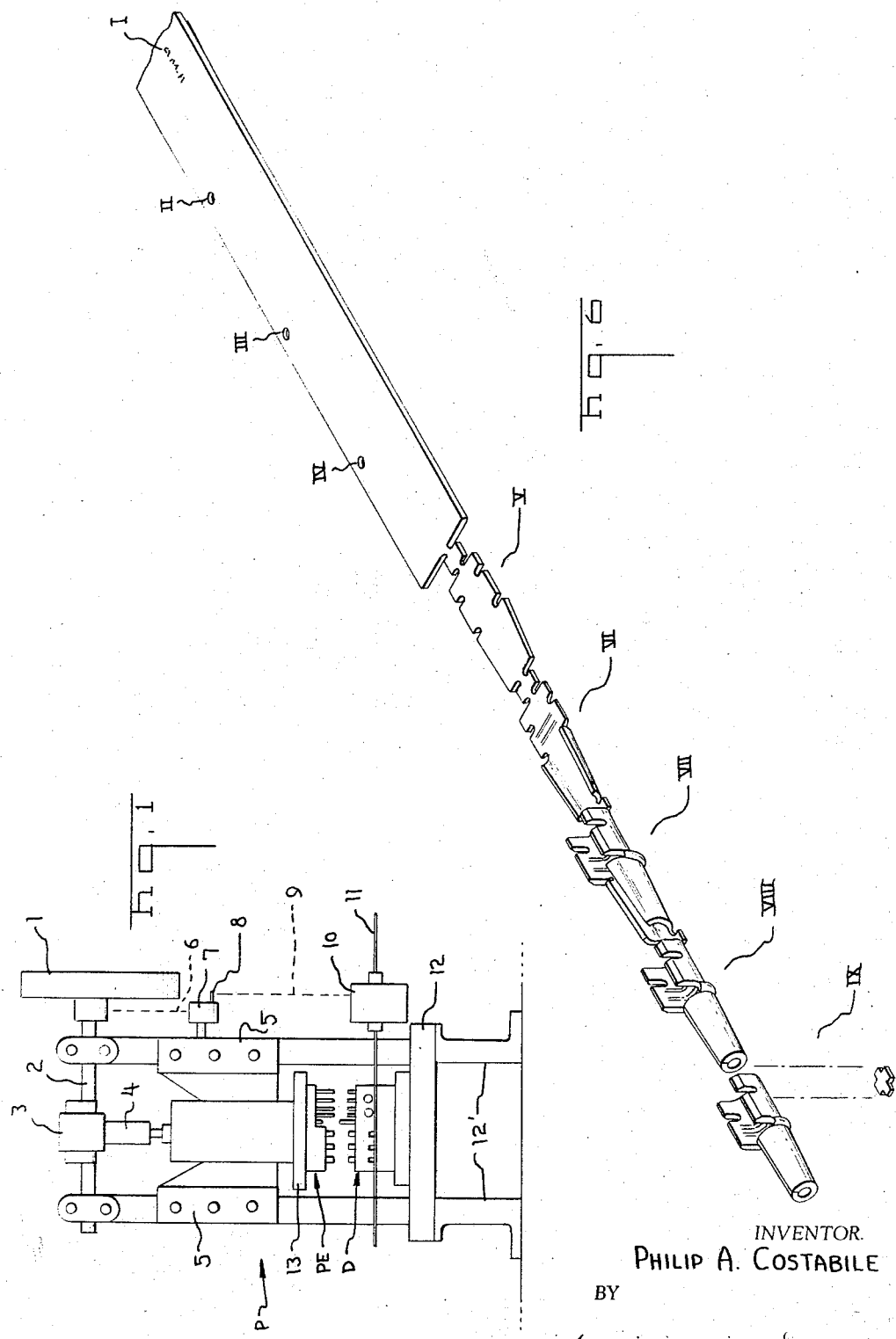
INVENTOR.
PHILIP A. COSTABILE
BY
Curtis, Morris & Safford

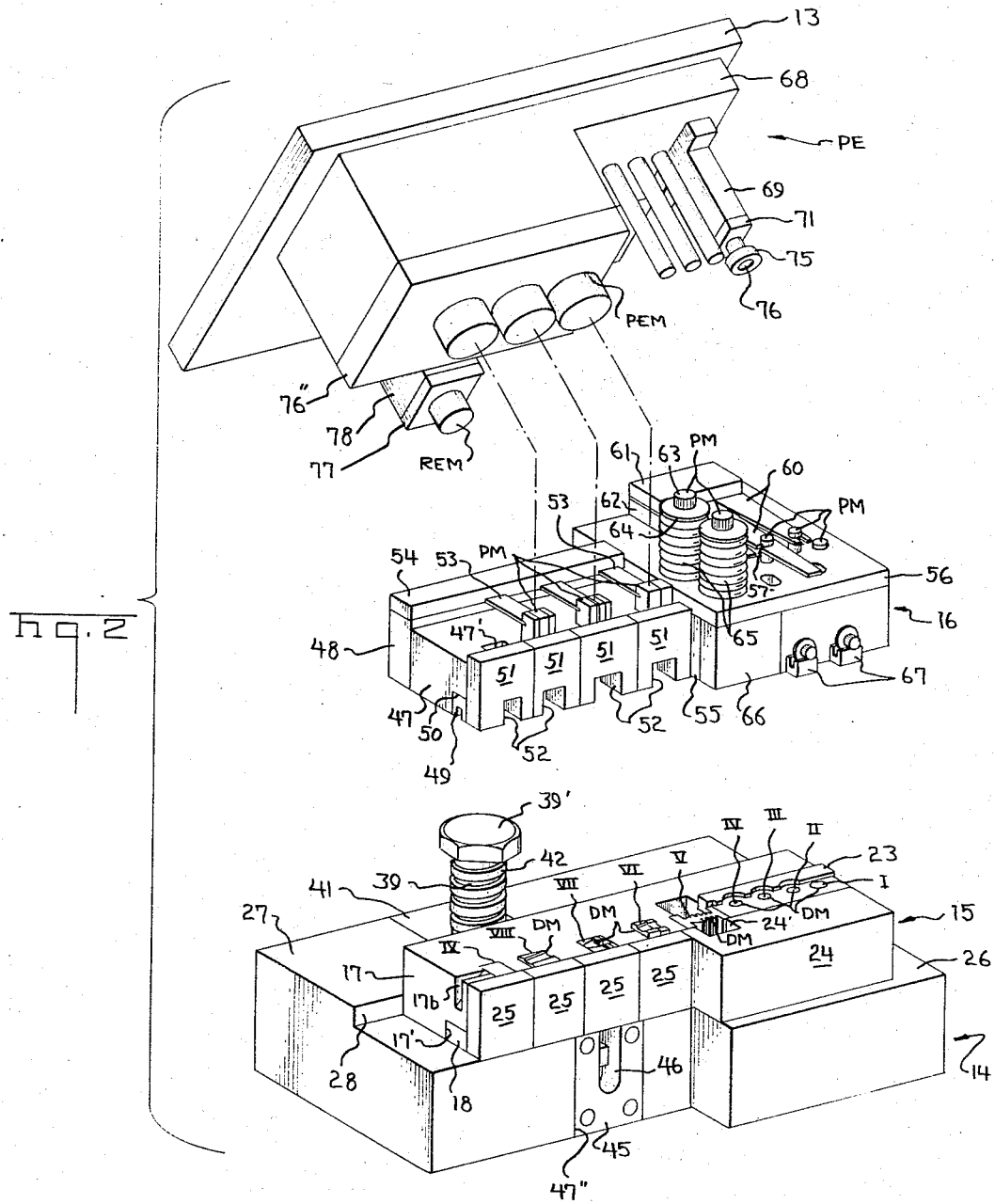

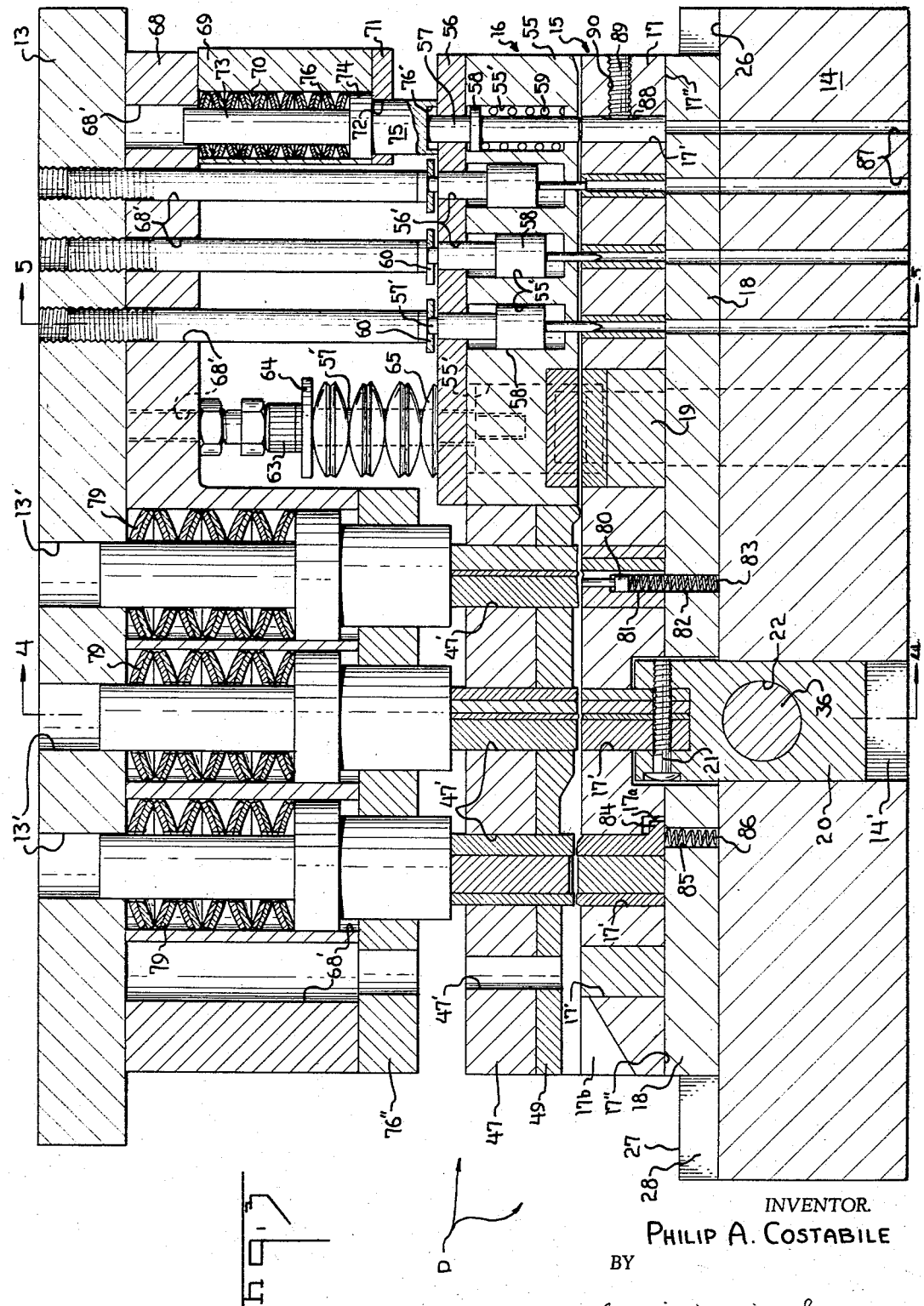

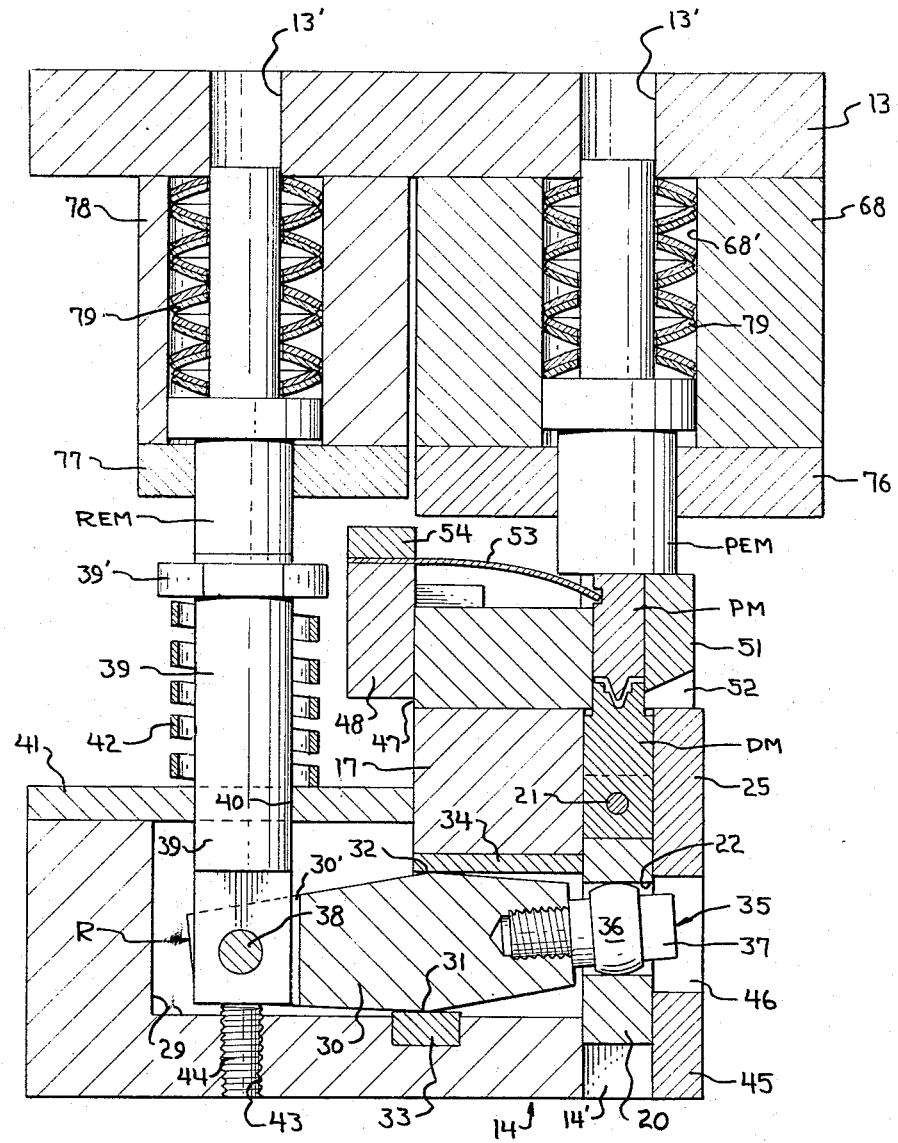

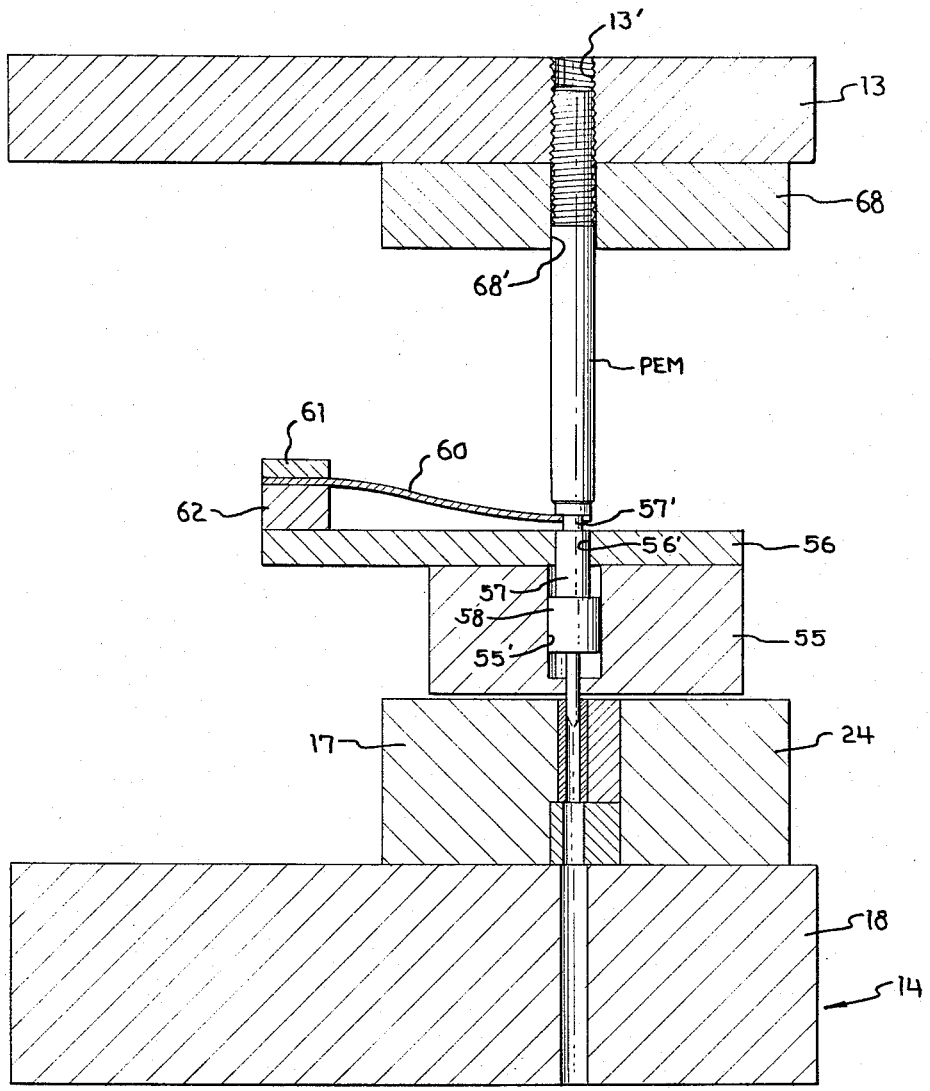

United States Patent Office

3,292,412
Patented Dec. 20, 1966

3,292,412
PROGRESSIVE DIE
Philip Anthony Costabile, Colonial Park, Harrisburg, Pa., assignor to AMP Incorporated, Harrisburg, Pa.
Filed Dec. 13, 1963, Ser. No. 330,428
18 Claims. (Cl. 72—335)

This invention relates to stamping, drawing or forming dies for use in manufacturing material to certain configurations and more particularly to progressive types of dies thereof.

In the field of progressive die presses, it is the general concept to mount part of the die on a stationary mounting press while the other part is mounted on the ram and movable therewith to engage the workpiece material disposed on the stationary die in order to provide various operations thereon at different stations of the progressive die. Thus, both parts of the die are generally a solid piece of material except for one or two stations having compensation means; and when they engage one another with the material therebetween, the die parts have to be made of extremely hard material in order to withstand the constant intermittent operation thereof since all of the weight of the movable die is brought to bear on the stationary die part.

With the foregoing arrangement, the die parts have to be maintained in strict parallelism so that they uniformly engage each other in order to ensure good quality and consistent work on the material. If the die parts are not strictly parallel, a large amount of time is expended to obtain the desired parallelism and height requirements. Also, constant shimming in the punch area is a frequent operation as a result of nonparallelism and wear, vision of the work-piece while progressing through die during operation thereof is impossible so that when a problem occurs, it cannot be readily discerned, changing the die from one press to another is a constant problem, fluctuation in precision products requires adjustment of die, repair or shimming thereby causing a high percentage of scrap, and major smashups are an inherent problem.

It is a primary object of the present invention to provide a progressive die means which can be installed on a press in a minimum amount of time.

Another object of the present invention is to provide progressive die means which can be installed on a precision or nonprecision press and parallelism is not required.

A further object of the present invention is to provide a progressive die means wherein the workpiece can be viewed while progressing through the die means and during operation thereon.

An additional object of the present invention is the provision of a progressive die means wherein press interchangeability is no problem.

A still further object of the present invention is to provide a progressive die means which, to a substantial degree, requires no shims in the die punch area.

Still another object of the present invention is the provision of a progressive die means which provides repeated products of quality and consistency with no shimming or adjustments, except for die wear, which will either be replaced or resharpened and will definitely reduce scrap.

Still a further object of the present invention is the provision of a progressive die means which is substantially devoid of major smashups.

Other objects and attainments of the present invention will become apparent to those skilled in the art upon a reading of the following detailed description when taken in conjunction with the drawings in which there is shown and described illustrative embodiments of the invention; it is to be understood, however, that this embodiment is not intended to be exhaustive nor limiting of the invention but is given for purposes of illustration in the invention and principles thereof and the manner of applying it in practical use so that they may modify it in various forms, each as may be best suited to the conditions of a particular use.

In the drawings:

FIGURE 1 is a front elevational view of a standard press incorporating the present invention;

FIGURE 2 is a perspective view of the progressive die means of the present invention;

FIGURE 3 is a longitudinal cross-sectional view of the die means in operation;

FIGURES 4 and 5 are cross-sectional views taken along lines 4—4 and 5—5 of FIGURE 3; and FIGURE 6 is a perspective view showing the various operations at the different stations on a workpiece by the die means described.

Referring in detail to the drawings, a standard press P is shown in FIGURE 1 to which the present invention is applied. Press P includes a drive wheel 1 mounted on a shaft 2 which has an eccentric 3 for reciprocating ram 4. Ram guides 5 are provided for guiding ram 4 during reciprocation thereof. A drive means is connected to shaft 2 and is represented by broken line 6 which may be a chain or pulley driven means from motive means, such as an electric motor (not shown).

Also connected to drive means 6 is a pulley 7 having an eccentric 8 thereon which has a member 9, such as a lever and illustrated by a broken line pivotally connected thereto and standard workpiece feeding means 10 which in turn successively feeds workpiece 11 to and through die means D. The die means are disposed on a base member 12 which is disposed on legs 12'. Ram 4 is provided with ram head 13. Punch engaging means PE is disposed on ram head 13.

Turning now to the die means D which are shown in a more specific manner in FIGURES 2–4, there is shown a mounting base 14, die retaining member 15 and punch retaining member 16.

Die retaining member 15 is provided with a number of die members which define a number of different stations each of which performs a definite operation on workpiece 11 as it is fed through the operating part of the die means.

Die retaining member 15 includes a main block member 17 having a plurality of spaced openings 17' therein which are normal to the longitudinal axis of the die means. Disposed in each one of these openings in a die member DM which are identified as station I through station IX. The openings for each of stations I–IV correspond to the configuration of the die members retained therein while the openings for stations VI–IX have three sides corresponding to that of three sides of the die members therein. Station V has two sides corresponding to that of the die member therein and one side extends outwardly from the corresponding side of the die member. Disposed below the station openings and extending the length of block member 17 is a recess 17".

Disposed in recess 17" is a two-part abutting member 18 which has one part under stations I–VI and the other part under stations VIII and IX. As can be seen, all of the stations except those of stations V and VII have the bottom surfaces of the die members therein abutting against abutting member 18 which is a hardened metallic member to ensure the stabilization thereof. At station V the bottom of the die member thereat rests on a supporting block 19 which, in turn, rests on abutting member 18. At station VII the bottom of the die member therein is disposed in a U-shaped slot of a cradle member 20. The die member and cradle member 20 are held together by a pin 21 passing through the legs of the U-shaped slot and the die member. Cradle member 20 has a hole 22 therethrough in which one end of a rocker assembly is disposed and which will be discussed hereafter.

Disposed in a recess in the upper surface of block member 17 adjacent stations I–IV and part of V is a workpiece guide member 23. One side of workpiece 11 engages guide member 23 during its travel through the die means. Another block member 24 engages block member 17 adjacent stations I–V, and cover plates 25 engage block member 17 adjacent stations VI–IX. Block member 24 has an opening 24' therein adjacent station V and this opening is similar to the outwardly extending one side in block member 17 at this same station. Block member 24 and cover plates 25 are secured to block member 17 by conventional means, such as screws and removal of member 24 and plates 25 from member 17 provides individual accessibility to the die members in stations V–IX in order to replace or repair same.

Mounting base 14 comprises a one-piece metallic member having mounting surface 26 and surface 27 disposed in parallel relationship and interconnected by a step portion 28. Die retaining member 15 is mounted on surface 26 and against step portion 28.

Base 14 is provided with a recessed portion 29 (see FIGURE 4) adjacent station VII in which rocker assembly R is disposed. Rocker assembly R includes a rocker arm 30 which is inclined at the top and bottom edges from high points 31 and 32 thereof. A wear insert 33 is disposed in a slot in recessed portion 29 opposite point 31, and another wear insert 34 is disposed in a slot in the bottom of block member opposite point 32.

The outer end of rocker arm 30 has threadably mounted therein an engaging member 35 including a portion 36 having an arcuate exterior surface disposed in hole 22 and a square-shaped portion 37 which can be engaged by a wrench member in order to remove or place the engaging member on rocker arm 30. Of course, portions 36 and 37 can be formed into other configurations so long as they perform the desirable function.

The inner end of rocker arm 30 has pivotally mounted in a slot 30' thereof by a pivot pin 38 one end of an actuating member 39 which extends through an opening 40 of a cover plate 41. Actuating member 39 has a head 39' at the other end, and spring means 42, such as a compression spring, is disposed between head 39' and plate 41 in order to maintain the rocker assembly in a normally inoperative position. Disposed in base 14 and coaxial with actuating member 39 is a threaded hole 43 in which an adjusting screw 44 is threadably mounted in order to limit the movement of the rocker arm.

Base 14 has a slot 14' in which cradle member 20 is movably mounted, and a cover plate 45 having a U-shaped slot 46 therein is mounted in a recess 47' in base 14 contiguous slot 14' in order to maintain cradle member 20 in its movable position and to allow movement of portion 37 in slot 46 and access to engaging member 35 through slot 46 without having to remove plate 45.

As can be discerned, portion 36 freely moves in opening 22 during rocking movement of rocker arm 30 about points 31, 32 while opening 40 acts as a guide for actuating member 39 during operation of the rocker assembly.

Punch retaining member 15 is mounted on top of die retaining member 14 and comprises a first block 47 having a second block 48 mounted along the back side thereof. Block 47 has openings 47' disposed therein in corresponding relationship with stations VI–IX, and punch members PM are movably disposed in each of these openings. U-shaped inserts 49 are mounted in a step portion 50 in the bottom front portion of block 47 in between each opening 47' and these inserts act as a guiding means for the workpiece as it moves through the die means.

Cover plates 51 are mounted on the front side of block 47 adjacent openings 47' in order to maintain the punch members in their respective openings in block 47. Each of cover plates 51 has an opening 52 in the bottom thereof which allow observation of the operation of the punch members and the movement of the workpiece through the operating area of the die means. A spring means 53, such as a leaf or cantilever spring, is disposed between each punch member and block 48. One end of spring means 53 is disposed in a slot in the punch members and a slot in plate element 54 mounted on the top edge of block 48.

Mounted adjacent block 47 is a third block 55 in which openings 55' are disposed. In each opening 55', there is movably disposed a punch member PM corresponding to stations I–IV, and at station V two openings (only one shown) are equally disposed on each side of a vertical plane passing through the punch members in stations I–IV and VI–IX which openings likewise contain punch members therein. A plate member 56 is disposed over block 55 and includes openings 56' therethrough in communication with openings 55' and the two openings for station V. The diameter of openings 56' is less than that of openings 55'.

As can be seen from FIGURE 3, the punch members in stations I–V have a shank portion 57 whose diameter is slightly less than openings 56' through which they extend and the inner end of shank portion 57 merges with a head portion 58 whose diameter is slightly less than openings 55'. Thus, shank portions 57 moving in openings 56' and head portions 58 moving in openings 55' define guide means for the punch members in stations I–V. Also, head portions 58 engage plate member 56 in order to limit the upper movement of the punch members.

The bottoms of openings 55' for stations I–IV are provided with an opening in which the operating part of the punch member is normally disposed during the inoperative position thereof, and these operating parts extend beyond the bottom surface of block 55 when these punch members are actuated as shown in FIGURE 3.

In station I, a spring means 59, such as a helical spring, is disposed between head portion 58 and the bottom of opening 55' in order to maintain the punch member therein in a normally inoperative position. Each shank portion 57 of stations II–IV extending above plate member 56 has an annular groove 57' therein which receives the free end of a spring means 60, such as a leaf or cantilever spring similar to spring means 53, via a slot therein. The other end of each of spring means 60 is anchored between blocks 61, 62 mounted on plate member 56. Spring means 60, therefore, maintains the punch members in stations II–IV in an inoperative position.

The shank portions of the punch members in station V extend well above the punch members in the other stations, and the outer ends thereof have a head 63 thereon to bias a washer 64 against spring means 65, such as disc springs, disposed between plate member 56 and washer 64. Spring means 65, thus bias the shank portions of the punch members in station V to their inoperative positions. Cover plates 66 (only one being shown in FIGURE 2) cover the punch members in station V and are thereby readily accessible by removal thereof. A conventional adjustable workpiece guide means 67 is mounted on block 55 so as to push the workpiece against workpiece guide member 23 in block member 17.

The punch engaging means PE includes punch engaging members PEM corresponding to each station and which engage corresponding punch members to actuate same upon downward movement of ram 4. A retaining block 68 is mounted on ram head 13 and has a suitable number of openings 68' therein corresponding to each station and in each opening a punch engaging member is disposed. At stations II–V, the punch engaging members are threadably mounted in openings 68' in order to render them adjustable. The openings at stations II–IV are coaxial with openings 13' in ram head 13 and the punch engaging members thereat are also threadably disposed in these openings.

At station I there is mounted to block 68 a housing 69 having an opening 70 therethrough of larger diameter than opening 68' but coaxial therewith. A plate 71 is mounted on the bottom of housing 69 and includes an opening 72 therethrough of lesser diameter than opening 70 but coaxial therewith. The punch engaging member of station I is movably disposed in housing 69, and it comprises a shank portion 73, flange portion 74 and engaging portion 75. As can be seen, the shank and flange portions are disposed in openings 70 with a part of the shank portion disposed within opening 68' which acts as a guide for the punch engaging member in addition to flange 74 engaging opening 70. Engaging portion 75 extends through opening 72 and outwardly therefrom. A spring means 76, such as Schnorr disc springs, is disposed in opening 70 between block 68 and flange 74 in order to bias the punch engaging member to its inoperative position. Engaging portion 75 has a recess 76' disposed therein so that the top part of the punch member of station I is engaged by the bottom of recess 76' to actuate the punch member, and the bottom surface of engaging portion 75 engages plate 56 to prevent the punch member from moving downwardly any further while spring means 76 compensates for the movement of ram head 13 beyond the point that the punch engaging member is to move the punch member.

As can be seen from FIGURES 3 and 4, the punch engaging members at stations VI-VIII and the rocker engaging member REM are similar in construction as that of the punch engaging member at station I except that the shank portions of the punch engaging members have a portion extending within openings 13' coaxial with each opening 68'. Plate member 76" holds these punch engaging members in their proper positions in openings 68' of block 68 and plate 77 holds the rocker engaging member in position in a housing 78 mounted on ram head 13. Spring means 79 for the punch engaging members in stations VI-VIII and the rocker engaging member are preferably Schnorr disc springs.

While the various spring means mentioned heretofore have been identified, it is to be understood that other types of spring means can be utilized so long as the intended function is performed. Moreover, while no means have been disclosed to adjust the tension in the spring means for the punch members and the punch engaging members, it is obvious that such means can be provided when necessary.

As can be seen in FIGURE 3, the die member at station VI has a lifter member 80 movably disposed therein. Member 80 has a shank portion disposed in a corresponding opening in the top part of the die member and a flange portion of larger diameter than the shank portion which is disposed in an opening 81 of corresponding size and coaxial with the opening for the shank portion. This flange portion limits the upward movement of lifter member 80 so that a section of the shank portion extends above the topmost part of the member when the corresponding punch member is in its inoperative position in order to move the workpiece free of the die member so that the workpiece can be readily moved to the next station.

An opening 82 having the same diameter and coaxial with opening 81 is disposed in abutting member 18, and spring means 83 is disposed in openings 81 and 82 between the flange portion and the base member 14 in order to provide a bias on lifter member 80.

At station VIII, opening 17' has a recess 17a at the bottom thereof in communication therewith. Part of the die member in station VIII has an extension 84 movably disposed in recess 17a, and the upper movement of this die part is limited by extension 84 engaging the top of recess 17a. An opening 85 is disposed in member 18 opposite this die part at station VIII and a spring member 86 is disposed in opening 85 between the movable die part and base member 14 in order to operate in the same manner as that described in connection with pusher member 80.

Holes 87 are disposed in base member 14 and member 18 at stations I-IV and these holes are coaxial with the die members therein. Holes 87 are provided to allow scrap to pass therethrough so as to be free of the work area and also to serve as a means whereby the die members in these stations can be knocked free of block member 17 by a suitable punch (not shown) in order to readily replace same when necessary.

The die member in station I has a keyway 88 therein which is engaged by a set screw 89 threadably disposed in threaded hole 90 in block member 17 in order to maintain this die member in place as well as to adjust the position thereof in opening 17'.

*Operation.*—The operation of the present invention is described in connection with FIGURE 6 which shows the operation performed on the workpiece at each station to form the workpiece into a finished product such as, for example, an electrical connector.

Die means D is assembled and mounted on base member 12 and punch engaging means PE is assembled and mounted on ram head 13. Workpiece 11 is placed in workpiece feeding means 10, and upon actuation of the driving means, press P feeds the workpiece by successive incremental steps into the operating or work area of the die means.

When the workpiece reaches station I, the die member and punch member thereat stamps the workpiece with indicia, such as, a trademark or other desirable mark. The workpiece is then moved to station II where it is pierced by the punch member which enters the die bushing. Stations III and IV are pilot stations in which the punch members thereof pass through the hole formed at station II in order to align the workpiece.

At station V the punch members and die member form a profile in the workpiece corresponding to the desired initial configuration of the product. The workpiece is then moved to station VI at which the die member and punch member preform and swage the profiled part. When the workpiece is moved to station VII, the punch member and die member therein form the preformed and swaged profiled part into a U-shape. At station VIII, the U-shaped profiled part is rolled into its final form by the punch and die members therein.

The formed workpiece can then be fed as a successive and connected line of products in final form to a collecting means (not shown) such as a spool, box, etc. If desired, a cutting punch (not shown) can be movably mounted in station IX in the same manner as the punch members in stations VI-VIII, and the cutting punch can cut the finished products from the successive line upon engagement with the flat die member when the cutting punch is engaged by the corresponding punch engaging member (not shown). Upon the finished products being severed from the successive line, they are fed to a collecting means (not shown) via channel 17b.

While the present invention has been described in connection with die means having a certain number of stations, to form a specific product, it is to be understood that such is merely illustrative of the present invention and that the die means can be provided with either more or less stations and these can have any desired form to give to a workpiece as it is passed or fed therethrough.

An important advantage of the spring means at the various stations is that they take up any deflection that may occur, and parallelism is maintained throughout the die means due to the spring means so that the die means and punch engaging means can be moved to different presses, mounted thereon and be operating in a minimum amount of time. Also, there is complete accessibility to the parts of the die and punch engaging means so that a defective part can be readily replaced, sharpened or fixed without having to remove the die or punch engaging means from the press thereby providing a long sought advantage. In addition, the workpiece can be viewed in the work area as it is being operated on or fed therethrough which provides an essential indication of the progress and precision of the work being done as well as an indication of the proper operation of the die and punch members.

There has, therefore, been described a progressive die means wherein each station includes a punch member reciprocably mounted in a punch retaining means by spring means and each punch is engaged by a punch engaging means some of which are provided with spring means so that the die means maintains parallelism throughout operation to provide quality work regardless of the press in which it is mounted.

It will, therefore, be appreciated that the aforementioned and other desirable objects have been achieved; however, it should be emphasized that the particular embodiments of the invention, which are shown and described herein, are intended as merely illustrative and not as restrictive of the invention.

I claim:

1. An apparatus for operating on material at successive stages comprising mounting means having a plurality of die means disposed therein at spaced intervals therealong, a plurality of punch means movably disposed in said mounting means at spaced intervals therealong, each punch means being opposite a corresponding die means, spring means connected to each of said punch means to maintain same in a normally inoperative position, means for engaging said punch means to reciprocably move same into engagement with said die means which die and punch means perform operations on the material as it is placed therebetween, and further spring means connected to some of said engaging means, said spring means providing parallelism throughout said apparatus.

2. An apparatus according to claim 1 wherein said mounting means and engaging means are provided with means to provide complete accessibility to said die, punch and engaging means while said mounting and engaging means are maintained in a position for operation.

3. An apparatus according to claim 1 wherein said mounting means is provided with viewing areas to observe the operation of said die and punch means.

4. An apparatus for operating on sheet material at successive stages comprising a lower mounting means provided with a plurality of spaced and aligned openings, die means disposed in each of said openings, an upper mounting means provided with a plurality of spaced and aligned openings in correspondence with the openings in said lower mounting means, punch means movably disposed in each of the openings in said upper mounting means, spring means engaging each of said punch means to maintain same in a normally inoperative position, punch engaging means spaced from each of said punch means and adapted to be moved into engagement therewith to move said punch means into engagement with its corresponding die means and for performing an operation on the sheet material when placed therebetween, and further spring means connected to some of said punch engaging means, said spring means providing parallelism during operation of said apparatus.

5. An apparatus according to claim 4 wherein one of said die means is mounted on a cradle means, rocker means operatively connected to said cradle means and engaged by a rocker engaging means, said rocker engaging means upon engaging said rocker means causes said rocker means to rock about a rocking point to move said cradle means and die means thereon relative to said lower mounting means, and spring means connected to each of said rocker and rocker engaging means to maintain same in a normally inoperative position.

6. In a progressive die, mounting means having a plurality of aligned and spaced openings, die means disposed in each of said openings, punch means movably disposed in each of said openings, spring means engaging each of said punch means to maintain same normally spaced from said die means, punch engaging means normally spaced from engagement with said punch means, and additional spring means engaging some of said punch engaging means to maintain them in a normally inoperative position.

7. In a progressive die according to claim 6 wherein spaces are provided in said mounting means adjacent said die and punch means to observe the operation thereof.

8. A die device for use between the base and ram of a press, comprising a bottom mounting means disposed on the bed and having a plurality of openings therealong in alignment, die means disposed in each of said openings, a top mounting means disposed on said bottom mounting means and having a plurality of openings therein in correspondence with the openings in said bottom mounting means, punch means movably disposed in each of the openings of said top mounting means, spring means engaging each of said punch means to maintain same normally spaced from the corresponding die means, punch engaging means connected to the ram and spaced therealong in correspondence with said punch means, and additional spring means engaging some of said punch engaging means, said spring means provding parallelism between said die and punch means during operation of said press.

9. A die device according to claim 8 wherein said spring means engaging some of said punch means are leaf springs while the remainder of the spring means are disc springs.

10. A die device according to claim 8 wherein said additional spring means engaging some of said punch engaging means are disc springs.

11. A die device according to claim 8 wherein some of said punch means and punch engaging means are adjustable.

12. A press comprising a base plate, a die block supported on said base plate, said die block having a plurality of spaced and aligned openings, a die member in each of said openings, a punch block supported on said press contiguous said die block, said punch block having a plurality of openings each in correspondence with an opening in said die block, a punch member in each of said punch block openings, spring means engaging each punch member to maintain same in a normally inoperative position spaced from the corresponding die member thereof to define a work area between said die and punch members, a reciprocable ram spaced from said punch block, a punch engaging block on said ram, punch engaging members on said punch engaging block each in correspondence with a punch member, additional spring means engaging some of said punch engaging members to maintain same in a normally inoperative position, and driving means connected to said ram to reciprocate same so that said punch engaging members engage said punch members which, in turn, engage said die members.

13. A press according to claim 12 wherein some of said spring means engaging said punch members are cantilever spring means while the remainder are disc spring means.

14. A press according to claim 12 wherein said additional spring means are disc spring means.

15. The combination with a press having a bed and a ram reciprocable toward and away from said bed, a die block on said bed, said die block having spaced and aligned openings, a die member in each of said openings, a punch block on said die block, said punch block having openings in correspondence with the openings in said die block, a punch member in each of said punch block openings, spring means engaging said punch blocks to maintain same normally spaced from the die blocks to define a work area therebetween, means provided on said die and punch blocks to gain access to each of said die and punch members, a punch engaging block on said ram, punch engaging members on said punch engaging block in correspondence with the punch members, and additional spring means engaging some of said punch engaging members to maintain same in a normally inoperative position.

16. The combination according to claim 15 wherein said access means are provided with spaces to observe the operation of said die and punch members.

17. An apparatus for operating on material at successive positions comprising die-mounting means having a plurality of die means disposed therein at spaced intervals therealong, punch-mounting means a plurality of punch means movably disposed in said punch-mounting means, said punch-mounting means being stationary relative to said die-mounting means, each punch means disposed opposite a corresponding die means, and spring means in engagement with said punch means to maintain said punch means normally spaced from said die means.

18. An apparatus for operating on material at successive positions comprising die-mounting means having a plurality of die means disposed therein at spaced intervals therealong, punch-mounting means a plurality of punch means movably disposed in said punch-mounting means, said punch-mounting means being stationary relative to said die-mounting means, each punch means disposed opposite a corresponding die means, spring means in engagement with said punch means to maintain said punch means normally spaced from said die means, and punch engaging means disposed adjacent said punch means for engagement with said punch means to drive said punch means toward said die means.

References Cited by the Examiner
UNITED STATES PATENTS

| 2,169,802 | 8/1939 | Keller | 29—203 |
| 2,684,423 | 7/1954 | Hipple | 72—338 |
| 3,057,042 | 10/1962 | Lawson | 72—333 |

CHARLES W. LANHAM, *Primary Examiner.*

R. D. GREFE, *Assistant Examiner.*